US008909797B2

(12) United States Patent
Grosche et al.

(10) Patent No.: US 8,909,797 B2
(45) Date of Patent: Dec. 9, 2014

(54) ACTIVATING A DATA CONNECTION TO A DATA NETWORK VIA A MOBILE TELECOMMUNICATIONS NETWORK

(75) Inventors: Uwe Grosche, Neuss (DE); Michael Monse-Feldoff, Dortmund (DE)

(73) Assignee: Vodafone Holding GmbH, Dusseldorf (DE)

( * ) Notice: Subject to any disclaimer, the term of this patent is extended or adjusted under 35 U.S.C. 154(b) by 768 days.

(21) Appl. No.: 12/967,466

(22) Filed: Dec. 14, 2010

(65) Prior Publication Data

US 2011/0145349 A1  Jun. 16, 2011

(30) Foreign Application Priority Data

Dec. 15, 2009  (DE) .......................... 10 2009 058 193

(51) Int. Cl.
*G06F 15/16* (2006.01)
*H04M 15/00* (2006.01)
*H04L 12/14* (2006.01)
*H04W 76/02* (2009.01)

(52) U.S. Cl.
CPC ............ *H04W 76/02* (2013.01); *H04M 15/844* (2013.01); *H04L 12/1403* (2013.01); *H04L 12/1421* (2013.01); *H04M 15/8038* (2013.01); *H04M 15/8351* (2013.01); *H04M 15/858* (2013.01)
USPC ...... 709/228; 709/203; 455/432.3; 455/435.2

(58) Field of Classification Search
CPC . H04M 15/00; H04M 15/51; H04M 2215/44; H04M 2215/54; G06F 21/43
USPC .................................. 709/203, 227–229, 218
See application file for complete search history.

(56) References Cited

U.S. PATENT DOCUMENTS

| | | | |
|---|---|---|---|
| 2003/0229595 A1* | 12/2003 | Mononen et al. | ............... 705/63 |
| 2004/0116136 A1 | 6/2004 | Voehringer | |
| 2005/0044138 A1 | 2/2005 | Albert et al. | |
| 2005/0054325 A1* | 3/2005 | Morper | ......................... 455/410 |
| 2006/0123470 A1 | 6/2006 | Chen | |

FOREIGN PATENT DOCUMENTS

WO  2009/025600 A1  2/2009

* cited by examiner

*Primary Examiner* — David Lazaro
(74) *Attorney, Agent, or Firm* — International IP Law Group, PLLC

(57) ABSTRACT

An exemplary embodiment of the invention relates to a method for activating a data connection from a mobile terminal device to a data network via at least one mobile telecommunications network. In this exemplary method, a connection request from the terminal device is forwarded to a switching unit, activation conditions for activating the data connection are determined based on receipt of the connection request in the switching unit, and a message containing the activation conditions is sent to the terminal device independently of the data connection that is to be established.

15 Claims, 2 Drawing Sheets

ACTIVATING A DATA CONNECTION TO A DATA NETWORK VIA A MOBILE TELECOMMUNICATIONS NETWORK

CROSS REFERENCE TO RELATED APPLICATION

This application claims priority to German (DE) Patent Application No. 10 2009 058 193.6-55, filed on Dec. 15, 2009, the contents of which are incorporated by reference as if set forth in their entirety herein.

BACKGROUND

In mobile telecommunications networks, data services are known that make it possible to establish a packet-switching data connection between a terminal device that is connected to a mobile telecommunications network and a data network coupled to a mobile telecommunications network such as, for example, the Internet. As a rule, such services employ a packet data connection that is established via a packet service such as, for instance, GPRS (General Radio Packet Service), EGPRS (Enhanced GPRS), packet data transmission in the UMTS (Universal Mobile Telecommunications System) or HSDPA (High Speed Downlink Packet Access) or HSPA (High Speed Packet Access).

To an increasing degree, data services of the above-mentioned type can also be used when roaming, i.e. in cases when subscribers do not sign in to their home network but rather to another, so-called, visited network. In order for services of the home network to be made available to the subscriber, the access to data networks during roaming can be configured in the form of a so-called home access. This means that the access to the data network is made via the home network of the subscriber. For this purpose, a data connection request is forwarded by a switching unit of the visited mobile telecommunications network to the home network, which then establishes the connection to the data network.

As a rule, the conditions for access to the data service, especially the fees incurred for the use of the service, depend on the mobile telecommunications network from which the subscriber accesses the data service. Thus, when the data service is accessed from a visited mobile telecommunications network abroad, the fees are usually higher than when the data service is accessed from a visited mobile telecommunications network within one's own country or from one's home network.

For subscribers, the conditions for using the data service can often only be found in the rate schedules of their mobile telecommunications provider. This is impractical for users since such rate schedules are often not available, and the interpretation of the rates can be difficult because of differentiated fee structures. Consequently, the mobile telecommunications provider is faced with the problem that subscribers often do not use data services because they are afraid of incurring high fees.

SUMMARY

Exemplary embodiments of the invention relate to a data service for establishing a data connection to a data network via at least one mobile telecommunications network. In particular, exemplary embodiments relate to a method and to a network device for activating a data connection from a mobile terminal device to a data network via at least one mobile telecommunications network.

Before this backdrop, exemplary embodiments may facilitate enable a mobile telecommunications user to utilize a data service to access a data network via a mobile telecommunications network.

In one exemplary embodiment, an exemplary method is suggested for activating a data connection from a mobile terminal device to a data network via at least one mobile telecommunications network. With the exemplary method, a connection request from the terminal device is forwarded to a switching unit, activation conditions for activating the data connection are determined based on receipt of the connection request in the switching unit, and a message containing the activation conditions is sent to the terminal device independently of the data connection that is to be established.

According to another exemplary embodiment of the invention, an exemplary network device is provided for activating a data connection from a mobile terminal device to a data network via at least one mobile telecommunications network. The exemplary network device comprises a switching unit in which a connection request from the terminal device can be received, and a control system that is associated with the switching unit. The control system may be configured to determine activation conditions for activating the data connection based on receipt of the connection request in the switching unit, and to effectuate the transmission of a message containing the activation conditions to the terminal device independently of the data connection that is to be established.

The mobile telecommunications network to which the mobile terminal device is connected can be the home network of the terminal device. By the same token, however, the terminal device can also be connected to another, visited mobile telecommunications network. The data connection to the data network that is to be activated is preferably configured as a packet-switching data connection and can be established especially via a packet data service of the mobile telecommunications network.

According to an exemplary embodiment, activation conditions can be displayed to the user of the mobile terminal device before the activation of the data connection, so that the user is informed about the activation conditions. In this context, an advantage may be provided that the activation conditions are made available on the basis of a message that is transmitted to the terminal device independently of the data connection that is to be established. This means that the data connection that is to be established is not used for sending the message. In particular, it is preferably provided that the message is transmitted independently of a routing context that is set up in order to establish the data connection in order to forward data packets to the terminal device.

The transmission of the message independently of the data connection or of the routing context has the advantage that the data connection or the routing context does not have to be already set up or used in order to activate the data connection. In particular, this prevents fees from already being incurred for the use of the data connection in order to activate the data connection, said fees usually being relatively high during roaming. Thus, an exemplary embodiment of the invention can also be advantageously used in cases where the user is roaming.

In an exemplary embodiment of the method and of the network device, it may be provided that the data connection is activated after a response message sent by the terminal device has been received. In this manner, by sending a response message, the user of the terminal device has the possibility to bring about the activation of the data connection in a simple manner.

Another exemplary embodiment of the method and of the network device may provide that the message and/or the response message are transmitted via a message service provided by the mobile telecommunications network, especially a Short Message Service (SMS). Useable message services such as, for example, SMS, are generally supported by the existing mobile telecommunications networks and by the employed mobile terminal devices so that problem-free transmission of the message and/or the response message is also possible via visited mobile telecommunications networks, thus ensuring problem-free processing of the message in the terminal device. Moreover, in particular, a terminal device does not have to have special software in order to be able to activate the data connection to the data network, but rather a standard functionality of the terminal device can be used to receive and send messages via the message service.

In an exemplary embodiment of the method and of the network device, the connection request is made by indicating a destination in the data network and, on the basis of the activation, a connection is established from the terminal device to the destination. The destination in the data network can be, for example, a website or an e-mailbox in the data network. Since the destination is already specified in the connection request, in order for the terminal device to access the desired destination, it does not have to send another request after the activation of the data connection.

As already mentioned, a home network may be associated with the terminal device. In this context, one exemplary embodiment of the method and of the network device provides that the switching unit is located in the home network. Advantageously, this means that, in case of roaming, home access is made possible, or, in case of a home access, a simple and inexpensive possibility is created for activating a data connection to the data network as well as for providing activation conditions.

The terminal device can be connected to the home network or to a visited mobile network from which the connection request is forwarded to the home network. In this context, one exemplary embodiment of the method and of the network device is characterized in that the activation conditions are determined as a function of the mobile telecommunications network in which the connection request from the terminal device is first received. In this manner, as far as the activation conditions are concerned, a distinction can be made between access via the home network and roaming of the terminal device.

In another exemplary embodiment of the method and of the network device, an incoming switching unit of the mobile telecommunications network forwards the connection request to the switching unit of the home network, and the activation conditions are determined based on a feature of the incoming switching unit. The incoming switching unit is in the mobile telecommunications network to which the mobile terminal device is connected. This mobile telecommunications network can be determined on the basis of the features of the incoming switching unit so that the activation conditions can be made to depend on the mobile telecommunications network to which the terminal device is connected.

Furthermore, in one exemplary embodiment of the method and of the network device, it is checked whether the terminal device is connected to a visited mobile telecommunications network, and the message containing the activation conditions is only sent once it has been ascertained that the terminal device is connected to a visited mobile telecommunications network. In this exemplary embodiment, the message may only be provided if the terminal device is not connected to the home network but rather to a visited mobile telecommunications network (i.e. in the case of roaming). Due to the higher fees, it is especially advantageous in case of roaming to transmit the activation conditions to the subscriber via the message before the activation of the data connection. In contrast, if the terminal device is connected directly to the home network, so that the costs of the data connection are normally lower, it can be provided that the activation takes place in another manner. For example, the activation can be carried out (automatically) on the basis of receipt of the connection request in the switching unit.

Moreover, in an exemplary embodiment of the method and of the network device, the activation conditions indicated in the message comprise at least one activation duration and/or one activation data volume. The activation duration preferably corresponds to the duration of the utilization of the data connection to the data network after the activation, and the activation data volume corresponds to a data volume that can be transmitted via the data connection after the latter has been activated. The activation conditions can comprise one activation duration and/or one activation data volume; however, several activation durations and/or activation data volumes can also be offered with the message to the user so that he/she can make a choice.

Moreover, in one exemplary embodiment of the method and of the network device, the response message contains confirmation of an activation duration and/or of an activation data volume, and the activation is carried out in accordance with this activation duration and/or with this activation data volume. In particular, this means that, after the end of the confirmed activation duration or after a confirmed activation data volume has been transmitted via the activated data connection, the data connection is once again blocked for that terminal device. If the user is offered several activation durations and/or activation data volumes to choose from, the confirmation is made for the activation duration and/or for the activation data volume that has been selected by the user.

BRIEF DESCRIPTION OF THE DRAWINGS

The above-mentioned and additional advantages, special features and practical refinements of the invention are also elucidated on the basis of exemplary embodiments, which are described below with reference to the figures.

DETAILED DESCRIPTION

Figure 1:
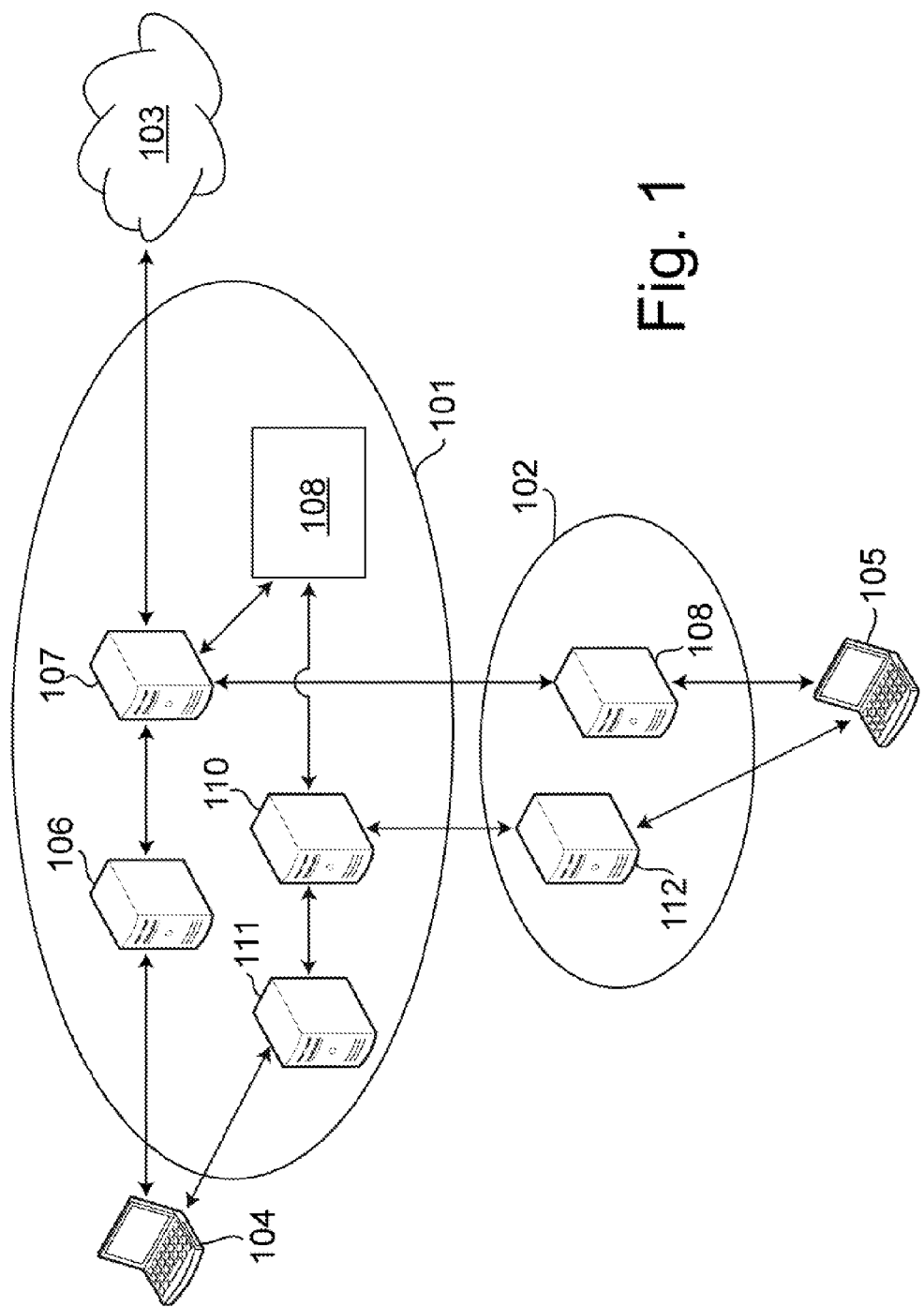
FIG. 1 is a block diagram of a network system with two mobile telecommunications networks according to an exemplary embodiment of the present invention.
Figure 2:
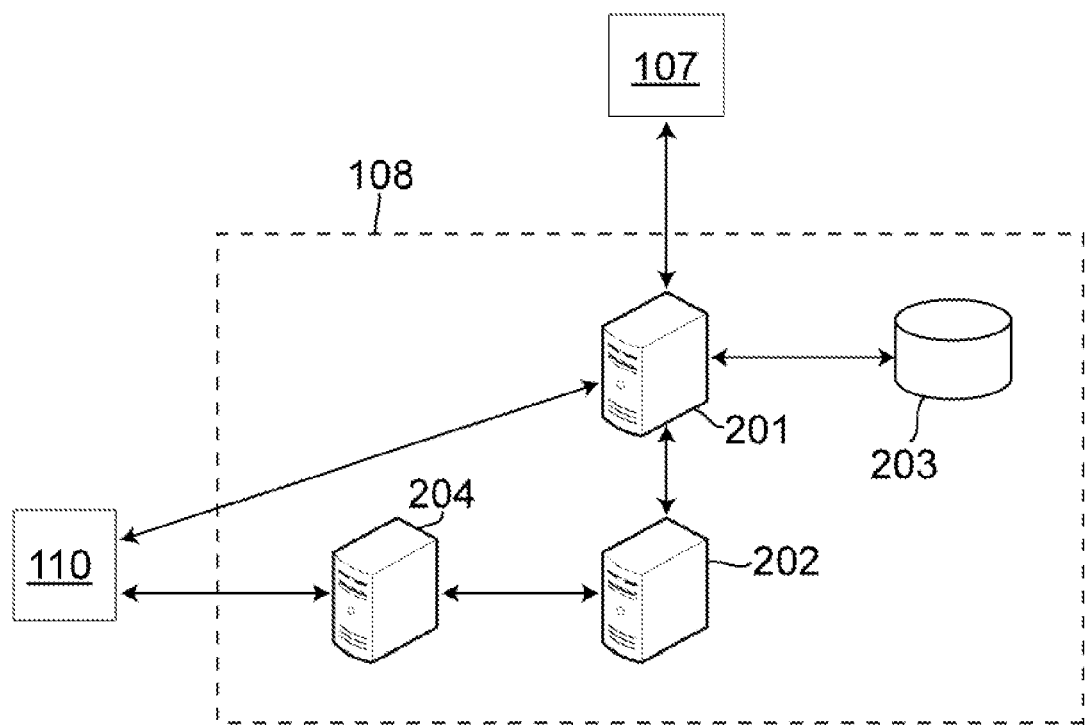
FIG. 2 is a block diagram of a control system that is associated with a switching unit of a mobile telecommunications network according to an exemplary embodiment of the invention.

FIG. 1 shows a schematic depiction of selected components of a network system comprising a first mobile telecommunications network 101 and a second mobile telecommunications network 102. The mobile telecommunications network 101 is connected to a data network 103 that can be, for example, the Internet or another public or private data network 103. Mobile terminal devices 104, 105 are connected wirelessly to the mobile telecommunications networks 101, 102 via a radio-based access network (not shown in the figure). The terminal devices 104, 105 can be configured, for example, as mobile telephone, as PDA (Personal Data Assistant) or as similar devices.

In the network system shown, a packet-switching data service is provided that makes it possible to exchange data packets between a terminal device 104, 105 that is connected to a mobile telecommunications network 101, 102, and a server (not shown in the figure) of the data network 103. The data exchange between the terminal device 104, 105 and the server is preferably based on the Internet Protocol (IP) and comprises, for instance, accessing and providing websites that can be displayed using a browser of the terminal device 104, 105, and it also comprises retrieving and/or sending e-mails using an e-mail client of the terminal device 104, 105. The data service for establishing the data connection to the data network 103 can be based, for example, on a packet data service that can be configured as a GPRS or EGPRS if the mobile telecommunications networks 101, 102 are configured as GSM or EDGE networks (GSM: Global System for Mobile Communications; EDGE: Enhanced Data Rates for GSM Evolution). If the mobile telecommunications networks 101, 102 are configured as UMTS networks, the data service can use the UMTS packet data service or else HSDPA or HSPA. By the same token, the mobile telecommunications networks 101, 102 can also be SAE/LTE networks in which corresponding packet data services are provided (SAE: System Architecture Evolution, LTE: Long Term Evolution).

In FIG. 1, two terminal devices 104, 105 are shown by way of example, and the first mobile telecommunications network 101—as the home network (HPLMN: Home Public Land Mobile Network)—is associated with each of these terminal devices 104, 105. This means that the terminal devices 104, 105 are registered in the HPLMN 101 and the users of the terminal devices 104, 105 are recorded as subscribers in the HPLMN 101. This is usually done on the basis of a contract between the users and the operator of the HPLMN 101. The terminal devices 104, 105 are registered especially under an identifier that can be configured as an IMSI (International Mobile Subscriber Identity) and that is unambiguously associated with the terminal devices 104, 105, as well as under an MSISDN (Mobile Subscriber Integrated Services Digital Network Number) associated with the identifier, which also serves as the phone number of the terminal device 104, 105. In the terminal devices 104, 105, identification data is stored in a subscriber identification module that is used to sign the terminal devices 104, 105 in to a mobile telecommunications network 101, 102. The subscriber identification modules are normally configured as a chip card or contained in a chip card that is inserted into the appertaining terminal device 104, 105, and they are issued by the operator of the HPLMN 101. In conjunction with GSM networks, the subscriber identification modules are configured, for example, as a SIM, and in conjunction with UMTS networks, as a USIM (SIM: Subscriber Identification Module; USIM: Universal Subscriber Identification Module).

In order to establish a packet-oriented connection to the data network 103, a terminal device 104, 105 logs in to the packet service of the mobile telecommunications network 101, 102, and a routing context is set up for the terminal device 104, 105 so that data packets can be sent to the terminal device 104, 105. For this purpose, preferably an IP address is associated with the terminal device 104, 105 within the routing context, which is also referred to as a PDP context (PDP: Packet Data Protocol), and which can be used to address data packets to the terminal device 104, 105.

The terminal device 104, which is connected to the HPLMN 101 in the scenario shown by way of example in FIG. 1, transmits an appropriate connection request to the HPLMN 101 in order to activate the routing context. The connection request can already indicate a destination in the data network 103 to which a connection is to be established and which can be identified in the connection request on the basis of its IP address or on the basis of a URL (Uniform Resource Locator) that can be associated with the IP address. In particular, the connection request can already contain access to a website provided by a given server or else a request to an e-mail server to send or retrieve one or more e-mails under a given e-mail account.

In the HPLMN 101, the connection request from the terminal device 104 is received in an incoming switching unit 106 in whose service area the terminal device 104 is located. The incoming switching unit 106, which may be configured as an SGSN (Serving GPRS Support Node), is especially responsible for forwarding data received from the terminal device 104 to downstream network nodes in a generally known manner and vice versa. The incoming switching unit 106 reports the connection request from the terminal device 104, 105 to another switching unit 107 of the HPLMN 101, which can be configured as a GGSN (Gateway GPRS Support Node). In general, a mobile telecommunications network 101, 102 comprises a plurality of such further switching units 107. In such a case, the selection of the switching unit 107 for processing the request from the terminal device 104 is made on the basis of appropriate addressing that is carried out by the terminal device 104 and that is contained in the connection request. A so-called APN (Access Point Name), which is associated with the switching unit 107 and which is stored in the terminal device 104, can be used for the addressing operation.

The further switching unit 107 makes a request to a control system 108 that is connected to the switching unit 107 in order to check whether the user of the terminal device 104 is authorized to use the data service for setting up a data connection to the data network 103. After an appropriate control command from the control system 108, namely, that the user can use the data service, the data connection to the data network 103 is activated via the switching unit 107. In one embodiment, the switching unit 107 sets up the routing context for the terminal device 104 on the basis of the confirmation from the control system 108, and then the routing context can be used to exchange data between the terminal device 104 and the data network 103. By the same token, however, it can also be provided that the routing context is already set up on the basis of the message of the connection request to the switching unit 107, and initially, it remains blocked for the exchange of data. The routing context for the exchange of data between the terminal device 104 and the data network 103 is then activated on the basis of the command from the control system 108.

If the connection request, as described above, already specifies a destination in the data network 103, then, after the routing context has been established or activated, an appropriate connection request is forwarded from the switching unit 107 to the data network 103 and from there to the specified destination. Consequently, there is no need for the terminal device 104 to transmit several requests to activate the data connection and to transmit the connection set-up to a certain destination.

The terminal device 105 shown in FIG. 1 is not connected to the HPLMN 101, but rather to a visited mobile telecommunications network (VPLMN) 102 that is coupled to the HPLMN 101. Connection requests from the terminal device 105 are received in an incoming switching unit 109 of the VPLMN 102, which may be configured as an SGSN. On the basis of the APN issued by the terminal device 105, the incoming switching unit 109 of the VPLMN 102 reports the connection request to the switching unit 107 of the HPLMN 101. The latter then handles the connection request fundamentally in the same manner as the connection request from the terminal device 104 that is connected to the HPLMN 101 and activates the data connection in the manner described above after a request to the control system 108. In one embodiment, the connection between the incoming switching unit 109 of the VPLMN 102 and the switching unit 107 of the HPLMN 101 is established via a backbone network (not shown in the figure), which can be configured, for example, as a GRX (GRX: GPRS Roaming Exchange).

One embodiment of the control system 108 is shown in FIG. 1. Here, the control system 108 has a control unit 201 that is connected to the switching unit 107 and that can be configured, for example, as an AAA server (AAA: Authentication, Authorization, Accounting). In this case, the communication between the control unit 201 and the switching unit 107 takes place via a suitable AAA protocol such as, for example, the well-known RADIUS-Protocol (RADIUS: Remote Authentication Dial-In User Service). In the embodiment shown, an administration unit 202 is connected to the control unit 201. Moreover, the control system 108 comprises a user database 203 in which authorizations to use the data service are stored for the users associated with the HPLMN 101, and it also comprises an accounting unit 204.

If a connection request from a terminal device 104 that is connected to the HPLMN 101 or from a terminal device 105 that is connected to the VPLMN 102 is reported to the switching unit 107, then this terminal device 104, 105 directs a request about the user authorization to the control unit 201. The request comprises at least one identification of the terminal device 104, 105 or of the user as well as an identification feature of the incoming switching unit 106, 109. The identification of the terminal device 104, 105 can be made on the basis of an identification feature that is contained in the connection request. In this context, this identification feature can be the phone number associated with the terminal device 104, 105 and configured as an MSISDN, or else it can be another identifier that is associated with the terminal device 104, 105 via the subscriber identification module. The identification feature of the incoming switching unit 106, 109 can be its IP address, which is sent together with the connection request from the terminal device 104, 105 to the switching unit 107.

After the control unit 201 has received the request from the switching unit 107, the conditions for the activation of the data connection to the data network 103 are determined. On the one hand, these conditions are based on the mobile telecommunications network 101, 102 to which the terminal device 104, 105 requesting the data connection is connected, and, on the other hand, on the contract between the user and the operator of the HPLMN 101. The contractual conditions for the user are stored in the user database 203 and can be retrieved from the user database 203 using the identification of the terminal device 104, 105. Depending on the contractual conditions, it is then ascertained whether the user has a type of contract that entitles him/her to use the data service.

The mobile telecommunications network 101, 102 to which the terminal device 104, 105 that is requesting the data connection is connected is determined on the basis of the IP address of the incoming switching unit 106, 109. For this purpose, an association between mobile telecommunications networks 101, 102 and IP addresses of incoming switching units 106, 109 from which connection requests can be forwarded to the switching unit 107 is stored in the control unit 201 or in another database that is connected to the control unit 201. Here, IP addresses of switching units 106, 107, 109 of a certain mobile telecommunications network 101, 102 can each be obtained from a number set associated with the mobile telecommunications network 101, 102. As a result, there is no need to indicate individual IP addresses of possible incoming switching units 106, 109 within the association, but rather only number sets with which the IP address of a specific incoming switching unit 106, 109 can be associated. In this embodiment, on the basis of the IP address of the incoming switching unit 106, 109 transmitted by the switching unit 107, first of all, a number set is ascertained that belongs to the IP address. Then the mobile telecommunications network 101, 102 associated with the number set is determined The data connection to the data network 103 for the terminal device 104, 105 may be activated for a prescribed period of time or until a prescribed data volume has been used up. For this reason, the activation conditions comprise one or more periods of time and/or one or more data volumes which are associated with an activation fee that has to be paid. The possible periods of time and/or data volumes as well as the applicable fees depend on the type of contract of the user as well as on the mobile telecommunications network 101, 102 to which the terminal device 104, 105 of the user is currently connected. For this purpose, mobile telecommunications networks 101, 102 can be associated with one of several roaming classes that are each associated with prescribed activation conditions.

Once the activation conditions have been determined, a message containing the activation conditions is generated in the control unit 201 and sent to the terminal device 104, 105. In one embodiment, the transmission of the message is initiated by the control unit 201. The message can be addressed on the basis of the MSISDN of the terminal devices 104, 105, said MSISDN being transferred from the switching unit 107 to the control unit 201, or else being requested from the user database 203 on the basis of another identifier transmitted from the switching unit 107 to the control unit 201.

The message is transmitted to the terminal device 104, 105 independently of the data connection that is to be set up in data network 103. In other words, this especially means that the routing context that is to be established in order to set up the data connection is not used for transmitting the message. As a result, the routing context only needs to be established at a later point in time. Moreover, fees for the use of the data connection or of the routing context, which are usually relatively high, especially when the terminal device 105 is connected to the VPLMN 102, are not charged at first.

In one embodiment, the message is transmitted to the terminal device as an SMS message. For this purpose, the control unit 201 is connected to an SMS Service Center (SMSC) 110 of the HPLMN 101 to which the control unit 201 forwards the message for the transmission to the terminal device 104, 105. From the SMSC 110, the message can be transmitted to the terminal device 104, 105 via the line-switching part of the HPLMN 101 and, if applicable, of the VPLMN 102. In this case, the message is transmitted to the terminal device 104, 105 via one or more switching units 111, 112 of the HPLMN 101 and/or of the VPLMN 102. The switching units 111, 112 can especially be configured as MSCs (MSC: Mobile Switching Center). At the same time, however, as is normally the case with an SMS, the message can be transmitted via the packet-switching part of the HPLMN 101 and, if applicable, of the VPLMN 102.

Advantageously, the transmission of SMS messages is generally supported by the existing mobile telecommunications networks 101, 102, so that, when an SMS is used, the message can also be delivered to a terminal device 105 via visited mobile telecommunications networks 102 without any problem. Moreover, terminal devices 104, 105 generally support SMSs, and as a rule, SMSs can be used by all mobile telecommunications subscribers without a special activation or a certain type of contract. Consequently, when an SMS is used, it can be ensured that the message can also be received by the terminal device 104, 105 without any problem. In addition, receiving and sending SMS messages is associated with relatively low costs for mobile telecommunications subscribers, even when they are in a visited mobile telecommunications network 102. Furthermore, no special software such as a web browser is needed to receive, display and send messages, so that such software does not have to be started for the activation, and an activation of the data connection can also be carried out using terminal devices that do not have such software (in which the data connection, for example, is only used to retrieve and/or send e-mails).

Once the message has been received in the terminal device 104, 105, it is displayed on the terminal device 104, 105 in a manner generally known to the person skilled in the art, so that the user of the terminal device 104, 105 can see the ascertained activation conditions. If the user wishes to activate the data connection, then he/she generates a response message with his/her terminal device 104, 105 and this message is sent back to the HPLMN 101, for example, via the same service via which the message had also been sent to the terminal device 104, 105. If the message, as described above, is an SMS message, then the response message may be sent as an SMS message. The destination address to which the response message is to be sent may be indicated in the previously received message and can be automatically taken over from the received message.

Insofar as the activation conditions only contain a single period of time or a single data volume that the user can order, the response message contains confirmation to this effect. However, if the activation conditions contain several periods of time and/or data volumes, then the user can make a selection from these. The selection is likewise specified in the response message. For this purpose, it can be provided, for example, that the different selection possibilities are each associated with a digit and that the digit of the period of time or data volume selected by the user is entered in the response message.

The response message is transmitted via the HPLMN 101 and, if applicable, via the VPLMN 102 if the device 105 is located there, to an accounting unit 204 that is contained in the control system 108. The accounting unit 204 evaluates the response message and checks whether one of the possible activation conditions has been confirmed. Then, a payment or accounting procedure is carried out pertaining to the fees contained in the confirmed activation conditions. This is preferably done in that the fees are invoiced by the operator of the HPLMN 101 via the mobile telecommunications invoice generated for the user. For this purpose, the activation conditions, including the received fees, are preferably transmitted from the control unit 201 to the accounting unit 204. If the activation conditions contain several periods of time and/or data volumes that can be selected, then the accounting unit 204 determines the fees that are to be charged on the basis of the selection made by the user and specified in the response message.

Once the accounting procedure has been completed, the accounting unit 204 reports the activation conditions confirmed or selected by the user to the administration unit 202 of the control system 208, indicating the terminal device 104, 105. The administration unit 202 is capable of instructing the control unit 201 to send control commands to the switching unit 107. Moreover, it can be provided that the administration unit 202 reports the data volumes ascertained via the switching unit 107 for the terminal devices 104, 105 connected to the switching unit 107 via the HPLMN 101 and via the VPLMN 102. This is especially the case when the activation conditions of the data connection to the data network 103 encompass prescribed data volumes.

When the administration unit 202 receives the activation conditions, it instructs the control unit 201 to send a control command to the switching unit 107 in order to activate the data connection to the data network 103 for the terminal device 104, 105. Once the control command has been received, the switching unit 107 activates the data connection to the data network 103 for the terminal device 104, 105. For this purpose, first of all, the routing context for the terminal device 104, 105 is established, if this had not already been done when the connection request was received from the terminal device 104, 105. Then the terminal device 104, 105 is permitted to use the routing context. This means that, via the routing context, data can be exchanged between the terminal device 104, 105 and the data network 103. First of all, a connection is preferably established to the destination in the data network 103, which is specified in the connection request sent by the terminal device 104, 105. In this manner, the terminal device 104, 105 does not have to call the desired destination separately from the initiation of the activation.

If the activation conditions provide a period of time for the use of the data service, then a timer is started in the administration unit 202 when the data connection is activated, and this timer ascertains the end of the period of time. When the timer ascertains that the period of time ordered by the user has expired, the data service for the terminal device 104, 105 is blocked again. For this purpose, the administration unit 202 instructs the control unit 201 to transmit an appropriate control command to the switching unit 207. After this switching unit 107 has received the control command, it then no longer forwards any data packets addressed to the terminal device 104, 105 or sent by the terminal device 104, 105. Moreover, the switching unit 107 can remove the routing context for the terminal device 104, 105.

If the activation conditions comprise a certain data volume, the data volume is logged or counted down in the administration unit 202 on the basis of the corresponding messages of the control unit 201. The logged or counted down data volume can be the downlink data volume transmitted to the terminal device 104, 105, the uplink data volume send by the terminal device 104, 105, or else the total data volume, that is to say, the sum of the downlink and uplink data volumes. When the administration unit 202 determines that the data volume has reached the value ordered by the user, then the data connection to the data network 103 is blocked for the terminal device 104, 105. This is done in the same manner as for the expiry of a period of time ordered by the user for using the data connection to the data network 103.

In the embodiment described above, it is provided that the activation of the data connection in case of roaming and in case of a direct connection to the HPLMN 101 is carried out in the same manner by a response message of the user to a message containing the activation conditions. As an alternative, however, it can be provided that this is only the case if it has been determined that the terminal device 105 is connected to the VPLMN 102. If, on the other hand, it has been determined that the terminal device 104 that is requesting the data connection is connected directly to the HPLMN 101, then the data connection to the data network 103 can already be activated, for example, on the basis of receipt of the connection request in the switching unit 107. In this case, the activation can be carried out in accordance with the activation conditions agreed upon between the operator of the HPLMN 101 and the user, without this being displayed to the user before the activation. By the same token, it can be provided, for example, that activation conditions for the data connection that is to be set up are reported to the user via the previously established routing context, and the user selects and/or confirms the activation conditions, likewise by using the routing context. The activation of the routing context for the data connection to the data network 103 is then carried out on the basis of the selection or confirmation by the user.

Although exemplary embodiments of the invention has been described in detail in the drawings and in the description above, the presentations are to be understood as being illustrative and not as limiting; in particular, the invention is not limited to the explained embodiments. Thus, for example, instead of an SMS, another message service can be used for the transmission of the message containing the activation conditions to the terminal device 104, 105, and of the response message to the accounting unit 204. Additional variants of the invention and their execution ensue for the person skilled in the art from the above-mentioned disclosure, the figures and the claims.

Terms used in the claims such as "comprise", "have", "contain", "encompass" and the like do not exclude additional elements or steps. The use of the indefinite article does not exclude a plural. An individual device can execute the functions of several units or devices cited in the claims.

What is claimed is:

1. A method for activating a data connection from a mobile terminal device to a data network via at least one mobile telecommunications network, the method comprising:

forwarding a connection request from the terminal device to a switching unit, wherein a home network is associated with the terminal device, and the switching unit is located in the home network, wherein the connection request is forwarded by an incoming switching unit of the mobile telecommunications network to the switching unit of the home network, wherein the incoming switching unit is located in a visited network being different from the home network, and activation conditions are determined as a function of a feature of the incoming switching unit based on receipt of the connection request in the switching unit; and sending a message containing the activation conditions to the terminal device independently of the data connection that is to be established, wherein the message is transmitted via a message service provided by the mobile telecommunications network.

2. The method recited in claim 1, comprising activating the data connection after a response message sent by the terminal device has been received.

3. The method recited in claim 1, comprising transmitting a response message via a message service provided by the mobile telecommunications network.

4. The method recited in claim 3, wherein the message service comprises a Short Message Service.

5. The method recited in claim 1, comprising making the connection request by indicating a destination in the data network and, on the basis of the activation, establishing a connection from the terminal device to the destination.

6. The method recited in claim 1, comprising determining the activation conditions based on the mobile telecommunications network in which the connection request from the terminal device is first received.

7. The method recited in claim 1, comprising checking whether the terminal device is connected to a visited mobile telecommunications network, and sending the message containing the activation conditions only once it has been ascertained that the terminal device is connected to a visited mobile telecommunications network.

8. The method recited in claim 1, wherein the activation conditions indicated in the message comprise at least one activation duration and/or one activation data volume.

9. The method recited in claim 1, wherein the activation conditions indicated in the message comprise at least one activation data volume.

10. The method recited in claim 1, wherein a response message contains confirmation of an activation duration and/or of an activation data volume, the method comprising carrying out the activation in accordance with the activation duration and/or with the activation data volume.

11. A network device for activating a data connection from a mobile terminal device to a data network via at least one mobile telecommunications network, the network device comprising:

a switching unit in which a connection request from the terminal device can be received from an incoming switching unit of the mobile telecommunications network, wherein a home network is associated with the terminal device, and the switching unit is located in the home network, wherein the incoming switching unit is located in a visited network being different from the home network; and a control system that is associated with the switching unit, the control system being configured to determine activation conditions for activating the data connection on the basis of receipt of the connection request in the switching unit as a function of a feature of the incoming switching unit, and to effectuate the transmission of a message containing the activation conditions to the terminal device independently of the data connection that is to be established, wherein the message is transmitted via a message service provided by the mobile telecommunications network.

12. The network device recited in claim 11, wherein the data connection is activated after a response message sent by the terminal device has been received.

13. The network device recited in claim 12, wherein the response message is transmitted via a message service provided by the mobile telecommunications network.

14. The network device recited in claim 11, wherein the message service comprises a Short Message Service.

15. The network device recited in claim 11, wherein the connection request is made by indicating a destination in the data network and, on the basis of the activation, establishing a connection from the terminal device to the destination.

* * * * *